W. VIAL.
INJECTOR VALVE.
APPLICATION FILED JULY 26, 1910.
1,002,884.
Patented Sept. 12, 1911.
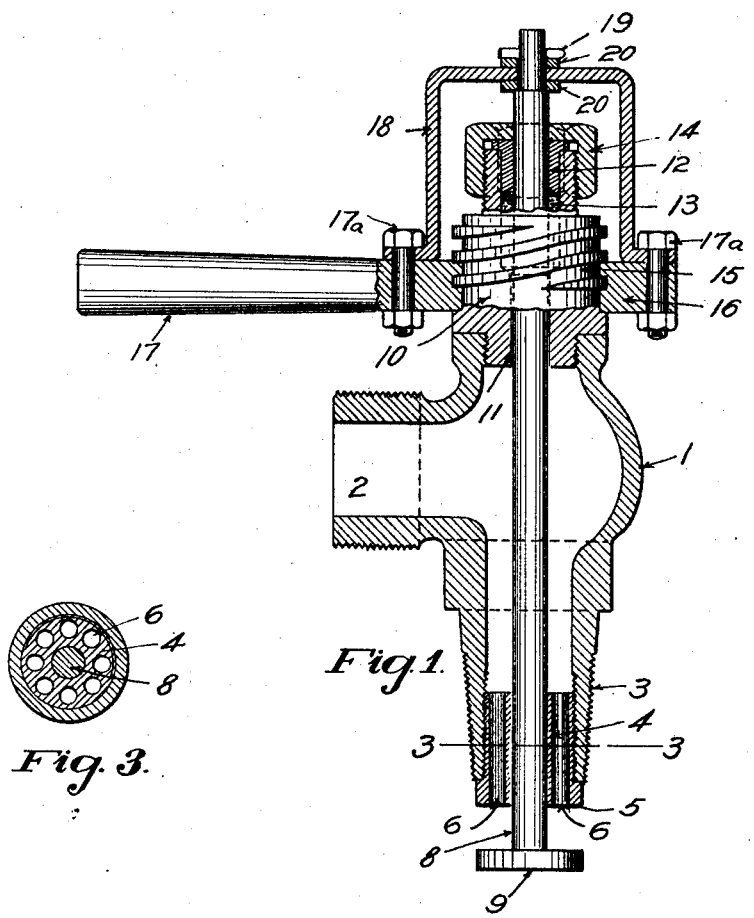
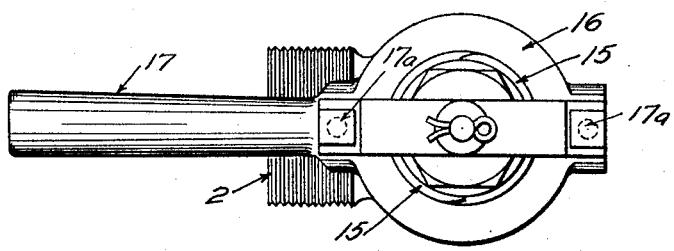
WITNESSES
INVENTOR
William Vial
By Fred'k W. Winter
Attorney

UNITED STATES PATENT OFFICE.

WILLIAM VIAL, OF SWISSVALE, PENNSYLVANIA, ASSIGNOR OF ONE-THIRD TO WILLIAM D. BERRY, OF NEW BRIGHTON, PENNSYLVANIA, AND ONE-THIRD TO JOHN VIAL, OF BRADDOCK, PENNSYLVANIA.

INJECTOR-VALVE.

1,002,884.  Specification of Letters Patent.  Patented Sept. 12, 1911.

Application filed July 26, 1910. Serial No. 573,925.

*To all whom it may concern:*

Be it known that I, WILLIAM VIAL, a resident of Swissvale, in the county of Allegheny and State of Pennsylvania, have invented a new and useful Improvement in Injector-Valves, of which the following is a specification.

This invention relates to valves, and more particularly to injector valves.

The object of the invention is to provide a valve of the kind specified which is easy to operate, and which is less liable to get out of order, more durable, and has a longer life than similar valves as heretofore constructed.

The invention comprises the construction and arrangement of parts hereinafter described and claimed.

In the accompanying drawing Figure 1 is a vertical section through an injector valve showing my improvements applied thereto; Fig. 2 is a plan view of the same; and Fig. 3 is a cross section on the line 3—3, Fig. 1.

The valve shown comprises a body 1 having the inlet 2 through a projection on one side which is externally threaded for connection to the supply pipe, and having the outlet through the lower end. The lower end of the body is externally threaded, as at 3, for attachment to the part to which the valve is to be connected. In the lower end of the body is a renewable valve seat 4, in the form of a bushing threaded into the lower end of the body and having a flange 5 abutting against the end of the body and having a flat lower face forming the valve seat. The outlet is through a series of holes 6 through said seat around a central hole through which passes the stem 8 of the valve 9 which is arranged to seat against the lower face of the seat 5 and close the passage through the valve.

The upper end of the valve body is provided with a circular portion 10 which is shown as a separate member or bonnet having a threaded connection into the upper end of said body. The bonnet 10 is provided with a central opening 11 through which the valve stem 8 passes, and is recessed in its upper end to receive the gland 12 and packing 13 of a stuffing box, said gland being forced inwardly by means of a cap 14 having a threaded engagement with the reduced upper end of the bonnet.

The bonnet 10 is provided externally with coarse square threads 15 which are engaged by corresponding threads in a ring 16 to which is connected the operating handle 17. Preferably the threads on the bonnet and in the operating handle are double in order to provide a steep pitch to give quick action. Secured to the ring 16, such as by bolts 17ª, is a yoke 18 provided in its upper member with a hole through which the upper end of valve stem 8 passes, said stem being secured to the yoke by any suitable means, such as cotter pin 19 and washers 20.

The operation of the valve will be understood from the illustration and description. By operating the handle 17 the yoke 18 is caused to rise or fall and carries with it the valve stem and valve. The entire construction is very simple, and one not subject to material wear. The screw threads are very coarse and on large external parts. The valve stem itself is smooth where it passes through the stuffing box. The large external threads do not wear nearly as quickly as the small threaded valve stems engaging internal threads in the bonnet which have heretofore been used. Furthermore, the valve stem may be allowed a loose connection with the yoke so that it will have no rotary movement but merely an up and down movement and hence will be less severe on the stuffing box. The valve seat is a flat face on the extreme end of the body and can be readily ground whenever worn. When worn to excess the bushing can be removed and a new valve seat substituted.

What I claim is:

1. In an injector valve the combination of an integral body provided with a side inlet and with an outlet at one end, said body having its outlet end threaded externally and provided with a seat on said end, a valve coöperating with said seat and having a stem extending through and guided in an opening through said seat, a stuffing box through which said stem passes, and operating means connected to the outer end of said stem.

2. In an injector valve the combination of a body provided with an inlet and an outlet, a valve seat secured in the outlet end of said body and provided with a series of outlet openings therethrough and a central opening for a valve stem, a valve adapted to seat against a face of said valve seat and provided with a stem extending through the central opening therein, a stuffing box through which said stem passes, and operating means connected to the outer end of said valve stem.

3. In an injector valve the combination of an integral body provided with a side inlet and with an outlet at one end, said body having its outlet end threaded externally and provided with a seat on said end, a valve coöperating with said seat and having a stem extending through and guided by the same, said body being provided on its opposite end with external threads and with an opening through which the valve stem projects, a stuffing box on said body and surrounding said valve stem, and operating means connected to said stem and operatively connected with the external threads on the body.

In testimony whereof, I have hereunto set my hand.

WILLIAM VIAL.

Witnesses:
JAS. L. WELDON,
F. W. WINTER.

Copies of this patent may be obtained for five cents each, by addressing the "Commissioner of Patents, Washington, D. C."